United States Patent
Fang et al.

(10) Patent No.: US 12,026,096 B2
(45) Date of Patent: Jul. 2, 2024

(54) ON-DEMAND SHARED DATA CACHING METHOD, COMPUTER PROGRAM, AND COMPUTER READABLE MEDIUM APPLICABLE FOR DISTRIBUTED DEEP LEARNING COMPUTING

(71) Applicant: NATIONAL APPLIED RESEARCH LABORATORIES, Taipei (TW)

(72) Inventors: Yu-Bin Fang, Taipei (TW); Shuen-Tai Wang, Taipei (TW); Chau-Yi Chou, Taipei (TW)

(73) Assignee: National Applied Research Laboratories, Taipei (TW)

( * ) Notice: Subject to any disclaimer, the term of this patent is extended or adjusted under 35 U.S.C. 154(b) by 100 days.

(21) Appl. No.: 17/857,481

(22) Filed: Jul. 5, 2022

(65) Prior Publication Data

US 2023/0236980 A1    Jul. 27, 2023

(30) Foreign Application Priority Data

Jan. 21, 2022 (TW) .................................. 111102661

(51) Int. Cl.
  *G06F 12/00* (2006.01)
  *G06F 12/084* (2016.01)
  *G06N 3/04* (2023.01)
(52) U.S. Cl.
  CPC ............. *G06F 12/084* (2013.01); *G06N 3/04* (2013.01); *G06F 2212/254* (2013.01); *G06F 2212/6042* (2013.01)

(58) Field of Classification Search
  None
  See application file for complete search history.

(56) References Cited

U.S. PATENT DOCUMENTS

| | | | | |
|---|---|---|---|---|
| 11,740,816 | B1 * | 8/2023 | Doddaiah | G06F 3/0659 |
| | | | | 711/154 |
| 2018/0292825 | A1 | 10/2018 | Smolyanskiy et al. | |
| 2021/0035258 | A1 | 2/2021 | Ray et al. | |
| 2021/0240621 | A1 * | 8/2021 | Fu | G06F 12/084 |

* cited by examiner

*Primary Examiner* — Daniel D Tsui
(74) *Attorney, Agent, or Firm* — Rosenberg, Klein & Lee (57) ABSTRACT

Disclosed are an on-demand shared data caching method, a computer program, and a computer readable medium applicable for distributed deep learning computing. The method includes a step of dynamically building a distributed shared memory cache space, in which a distributed shared memory deployment and data file access management module is added to a deep learning framework to build the distributed shared memory cache space by a memory set of a multiple of computing nodes of a cluster computer; and a distributed deep learning computing step, in which the computing node overrides a Dataset API of the deep learning framework to execute the distributed deep learning computing. When reading a data file, if the data file exists in the distributed shared memory cache space, then it will be accessed directly, or else it will be obtained from an original specified directory location and stored in the distributed shared memory cache space.

9 Claims, 6 Drawing Sheets

ON-DEMAND SHARED DATA CACHING METHOD, COMPUTER PROGRAM, AND COMPUTER READABLE MEDIUM APPLICABLE FOR DISTRIBUTED DEEP LEARNING COMPUTING

FIELD OF THE INVENTION

The present invention relates to an on-demand shared data caching method, a computer program, and a computer readable medium applicable for distributed deep learning computing, and more particularly to those with the feature of using a computer to access memory with a speed much faster than the access of a hard disk (wherein the access speed of DRAM≈100 ns and the access speed of HDD≈10 ms) and integrating the memories of a plurality of computing nodes of a cluster computer to build a distributed shared memory cache space to execute distributed deep learning computing and improve computing performance.

BACKGROUND OF THE INVENTION

In the rapid technological development of medical image recognition, natural language processing, vehicle self-driving system, VR/AR technology, and even smart life such as Metaverse, deep learning and high performance computing (HPC) are indispensable.

High performance computing such as deep learning computing improve its computing performance gradually in the sequence of the traditional use of CPU computing, GPU computing and cluster computing. In the cluster computing technology, several independent computers are combined into a computer system through a high-speed network, the same computing job is divided, and the divided jobs are assigned to the computers to perform operations separately, thereby integrating the computing resources of the computers and improving the computing performance. Each computer of the cluster computer system is called a node, and users can login the system by logging in the node in order to operate the cluster computer system, and a job script can be submitted by logging in the node to request the computing resources, and then the computing node executes the high performance computing such as deep learning. In the cluster computing, a cache is set in the hard disk space as a storage node for storing the required data file, and the computing node will read the data file in cache for computation, and store the computed data file into this cache. Therefore, the data file required for the operation process does not need to be accessed from the original specified directory location every time, thereby reducing the accessing time of the data file.

Some of the related cluster computing technologies using cache for high-speed computing include are described below:

US20060195508 entitled "Distributed computing" has disclosed a data storage area (cache) used for storing data in a job of high performance computing (HPC), and these data stored in the data storage area are buffered and shared.

P.R.C. Pat. No. CN111031126 entitled "Clustered buffering and caching method, system, device and storage medium" has disclosed a heartbeat mechanism based on the nodes for buffering can maintain data synchronization between nodes and node list, and data can exist in a certain node by using the node list and other nodes can only maintain their cache mapping to avoid the problem of repeated download and inconsistency of the data.

P.R.C. Pat. No. CN107992270 entitled "Method and apparatus for global shared cache of multi-control storage system" has disclosed a global share cache of configuring the data of the local cache to the global shared cache of all nodes to achieve the effects of improving the utilization of cache space, optimizing the update process of the global shared cache, reducing the number of locking the global shared cache, and improving the response speed of IO requests.

P.R.C. Pat. No. CN111131402 entitled "Method, apparatus, device and medium for configuring a shared cache server group" uses a two-stage cache system to accelerate the reading speed of a popular webpage. In other words, after a previous user has read the webpage, the webpage information is stored in the cached data system to allow a multiple of users to read this webpage quickly in the future.

P.R.C. Pat. No. "CN109309711 entitled "Virtual cache sharing method and system" uses an OpenFlow to build a virtual cache sharing data file system.

L. Wang. et al., "DIESEL: A Dataset-Based Distributed Storage and Caching System for Large-Scale Deep Learning Training", ICPP '20, pp. 1-11, 2020 has pointed out that in order to avoid the file I/O being too slow and to prevent operation interruption, small-capacity files are compressed into data chunks, and metadata is used to search for the data trunks to speed up the reading of data. Metadata snapshots are stored in each node to avoid the node from being damaged or failing to read the data.

Mellanox Technologies provides an NVMe SNAPtechnology" Please refer to https://www.mellanox.com/files/doc-2020/sb-mellanox-nvme-snap.pdf for MellanoxNVMe SNAP™. With the virtualization of a smart network card (SmartNIC) and a storage device, a remote storage device is regarded as a local physical NVMeSSD, and a networked storage can be built to meet the storage requirements of cloud and cluster computing.

J. Yang, J. Izraelevitz, and S. Swanson, "Orion: A Distributed File System for Non-Volatile Main Memories and RDMA-Capable Networks", the 17$^{th}$ USENIX Conference on File and Storage Technologies, Feb. 25-28, 2019 has pointed out that RDMA technology and non-volatile memory hardware can be used to establish a network file system as cache.

J. Zhang, G. Wu, X. Hu, and X. Wu, "A Distributed Cache for Hadoop Distributed File System in Real-time Cloud Services", 2012 ACM/IEEE the 13$^{th}$ International Conference on Grid Computing has pointed out that user service requirements, network, hardware, software, and other resources are analyzed to create a cache system HD Cache.

In summation of the above related arts of cache technologies, most of them are established from the perspective of the administrators, so that they do not have the characteristics of on-demand, automatic resources configuration and zero intervention by users, and the above cache and buffer prior arts are built in the hard disk space. In actual operations, it is found that when a CPU or GPU repeatedly accesses the data file from the cache established in the hard disk space, there is still a bottleneck of I/O performance, thus limiting the cluster computing performance.

SUMMARY OF THE INVENTION

In order to further improve the cluster computing performance, the present disclosure provides a non-demand shared data caching method applicable for distributed deep learning computing, and the method includes:

a step of dynamically building a distributed shared memory cache space, in which a distributed shared memory deployment and data file access management module to a deep learning framework to share a part of memories of a plurality of computing nodes of a cluster computer and build a distributed shared memory cache space; and a step of executing a distributed deep learning computing by a cluster computer, in which the cluster computer executes a distributed deep learning computing, and the computing nodes override a Dataset API such as a Tensor-Flow (tf.data) and a PyTorch (torch.utils.data) required by the deep learning framework, and a data file access rule of the distributed shared memory deployment and data file access management module is added, and all computing nodes continues their execution, and when it is necessary to read a data file, if the data file exists in the distributed shared memory cache space, then the data file will be accessed directly, or else the data file will be obtained from an original specified directory location and stored in the distributed shared memory cache space.

Further, a resources configuration step is executed before the step of dynamically building a distributed shared memory cache space, in which a job script is written and the quantity of the computing nodes, the quantity of CPUs/GPUs and the size of the distributed shared memory cache space required for running the program are set and sent to a queueing system for configuring resources, and the information of the configured resources is stored into an environment variable for executing the job script, and the environment variable comprises a computing nodes list ($PBS_NODEFILE), the size of a distributed shared memory cache space ($PBS_GLBMEM), and the queueing system starts executing the program set in the job script of each computing node according to the assigned list of the computing nodes. In the step of dynamically building the distributed shared memory cache space, the computing nodes list ($PBS_NODEFILE) in the environment variable and the size of the distributed shared memory cache space ($PBS_GLBMEM) are read to set and build the distributed shared memory cache space, and the built distributed shared memory cache space is mounted on a mount point:/disfs of each computing node.

Further, when the step of dynamically building a distributed shared memory cache space is executed, an initial function will be called to perform an initialization, and the initial function is overridden to build the distributed shared memory cache space, and the distributed shared memory deployment and data file access management module uses a Gluster File System (GlusterFS) for execution to produce a RAM disk on the memory of each computing node, and then uses the GlusterFS to connect the RAM disk of each computing node in series to form the distributed shared memory cache space. For example, the memory is a temporary file system (tmpfs) in a Unix/Linux system.

Further, the distributed shared memory deployment and data file access management module adopts a remote direct memory access (RDMA) technology.

The on-demand shared data caching method applicable for distributed deep learning computing further includes a step of releasing resources, in which the distributed shared memory cache space is released after the distributed deep learning computing ends. Specifically, after the distributed deep learning computing ends, all programs will call a destructor (Finalize function) and override the destructor, such that each computing node unloads its distributed shared memory cache space, and all data files will disappear after the unload, such that the distributed shared memory cache space of the computing node is released.

The present disclosure further provides a computer program installed to a computer for executing the aforementioned on-demand shared data caching method applicable for distributed deep learning computing.

The present disclosure further provides a computer readable medium stored in the aforementioned computer program.

This disclosure has the following technical characteristics and effects:

1. Fast access of a large number of data: the distributed shared memory cache space at the memory level is adopted, so that the access speed can be greatly improved when compared with using a traditional hard disk (hdd) as cache (cache and buffer). This disclosure can store more and larger data files than the traditional cluster computing, and thus it can overcome the I/O performance bottleneck of repeatedly accessing a large number of small data files or super-large data files during deep learning computing, and improve the deep learning computing performance.
2. Storing data file at any time: The read data file will be buffered in the distributed shared memory cache space, and can be used repeatedly for fast reading by itself or other execution programs located at different computing nodes.
3. Expandable space: The distributed architecture of a cluster computer with multiple computing nodes is adopted, and the computing nodes can be dynamically added or removed to expand or reduce the capacity of distributed shared memory cache space.
4. On-demand: From the user's point of view, the distributed shared memory cache space can dynamically form an On-Demand Global Cached Memory according to the requirements of a computing job, and the job is released immediately after its completion without occupying the system memory space permanently.
5. Automatic resources configuration: From the user's point of view, the existing queueing system is integrated after the queueing system configures the appropriate computing node according to the user's needs, and then the distributed shared memory cache space is built according to the configuration result.
6. User's zero intervention: From the user's point of view, the distributed shared memory deployment and data file access management module is added to the existing distributed deep learning framework to automatically form the distributed shared memory cache space and access data files from the distributed shared memory cache space, so that users need not to modify the existing code or run additional programs.

DESCRIPTION OF THE PREFERRED EMBODIMENTS

The objectives, technical characteristics and effects of the on-demand shared data caching method, computer program, and computer readable medium applicable for distributed deep learning computing of the present disclosure will become apparent with the detailed description of preferred embodiments accompanied with the illustration of related drawings. It is intended that the embodiments and drawings disclosed herein are to be considered illustrative rather than restrictive.

Figure 1:
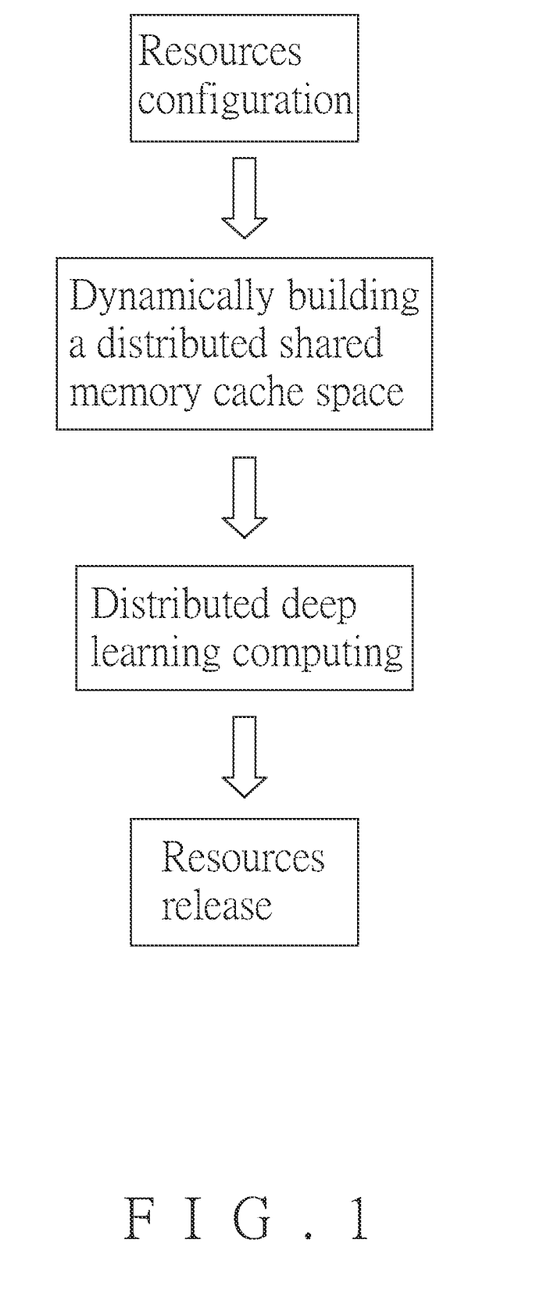
FIG. 1 is a flow chart of an embodiment of this disclosure invention.

With reference to FIG. 1 for an on-demand shared data caching method in accordance with an embodiment of the present disclosure, the method incudes: (1) a step of executing a resources configuration; (2) a step of dynamically building a distributed shared memory cache space; (3) a step of executing a distributed deep learning computing; and (4) a step of releasing resources.

Figure 2:
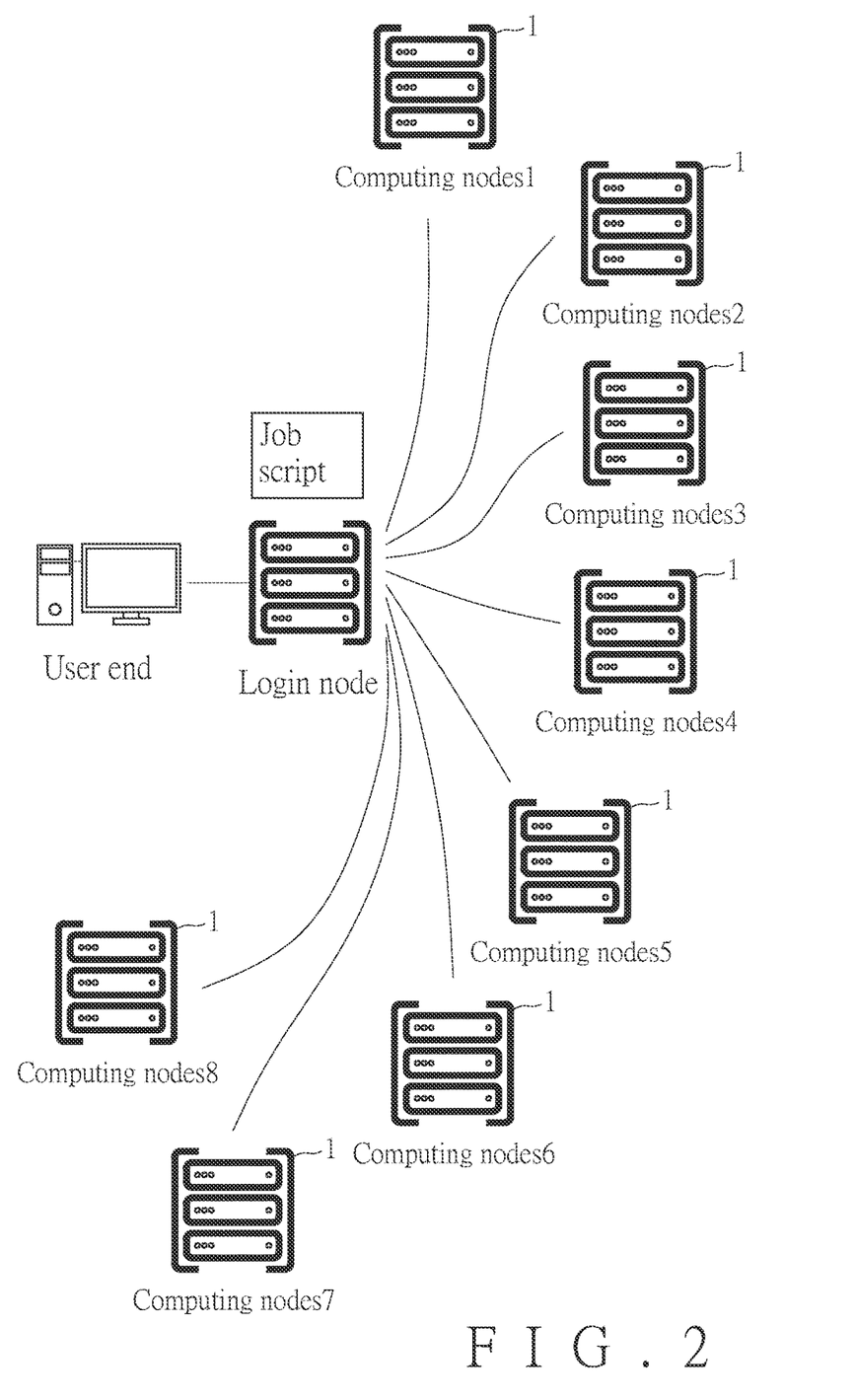
FIG. 2 is a schematic view showing a queueing system that configures resources and configures a computing nodes list ($PBS_NODEFILE) and the size of a distributed shared memory cache space ($PBS_GLBMEM) in accordance with an embodiment of the present disclosure.

In the step of executing the resources configuration step as shown in FIG. 2, users can write a job script according to the existing computer resources and use a cluster computer to set the quantity of computing nodes, the quantity of CPUs/GPUs and the size of the distributed shared memory cache space required for running the program of a distributed deep learning, and then send them to a queueing system for resources configuration, and the information of the configured resources is stored in an environment variable for executing the job script. The environment variable includes a node computer list ($PBS_NODEFILE), and the size of the distributed shared memory cache space ($PBS_GLBMEM), and the queueing system starts executing the programs set in the job script on each computing node 1 according to the assigned computing nodes list.

Figure 3:
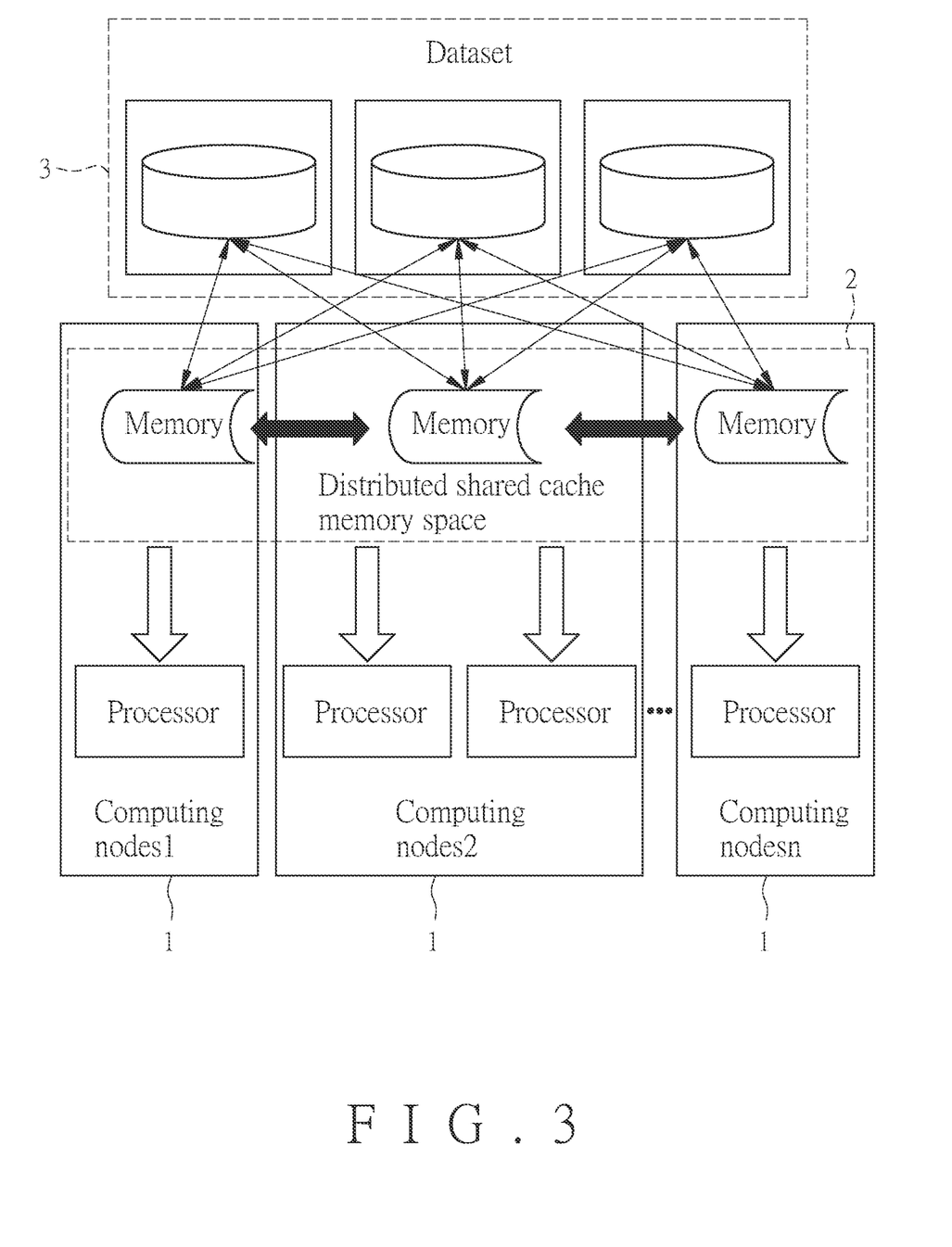
FIG. 3 is a schematic view showing a hardware architecture that executes distributed deep learning computing in accordance with an embodiment of the present disclosure.
Figure 4:
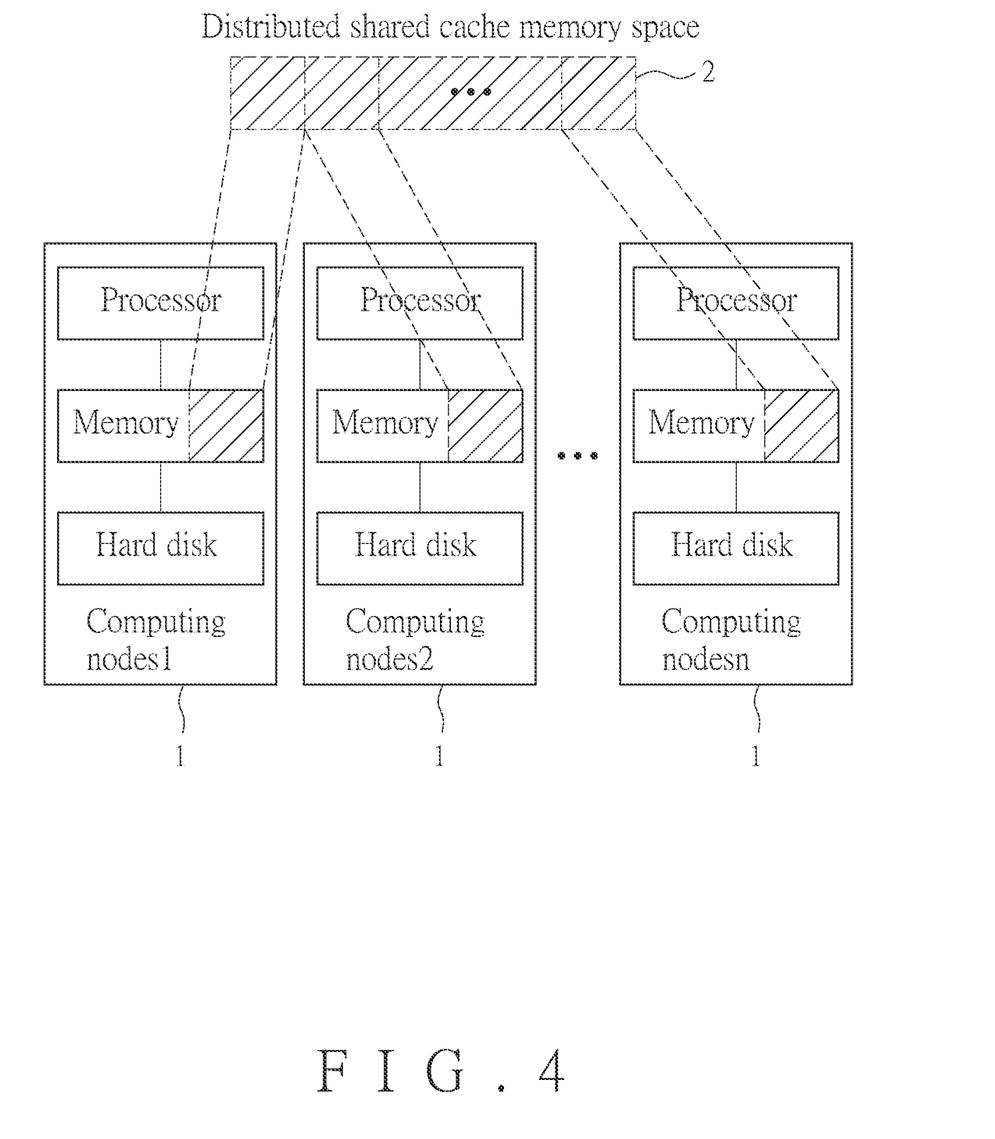
FIG. 4 is a schematic view of building a distributed shared memory cache space by the deployment of a distributed shared memory and a data file access management module according to the resources configuration result of a queueing system in accordance with an embodiment of the present disclosure.

The job script, for example, is as follows—
!/bin/bash
SBATCH-J job_name# Job Name
SBATCH--nodes 8 # of computing node
SBATCH--gres=gpu:16# Total GPUs #SBATCH--memory=256G # distributed shared memory cache space (total memory capacity)
python DL training.py # Executing deep learning training program With reference to FIGS. 3 and 4, in the step of dynamically building a distributed shared memory cache space, a distributed shared memory deployment and data file access management module is added to an existing deep learning framework, and a computer node list ($PBS_NODEFILE) and the size of a distributed shared memory cache space ($PBS_GLBMEM) in the environment variable are read to set a distributed shared memory cache space 2 and build the distributed shared memory cache space 2 which will be mounted on a mount point:/disfs of each computing node 1. Specifically, an initial function will be called to perform an initialization when the program is executed, and the initial function is overridden to build the distributed shared memory cache space 2, and the distributed shared memory deployment and data file access management module of this embodiment adopts a Gluster File System (GlusterFS) for execution, and a RAM disk is produced on the memory of each computing node 1, and then the GlusterFS connects the RAM disk of each computing node 1 in series to form the distributed shared memory cache space 2. This embodiment adopts a Unix/Linux system, and the memory is a temporary file system (tmpfs) in the Unix/Linux system.

Figure 5:
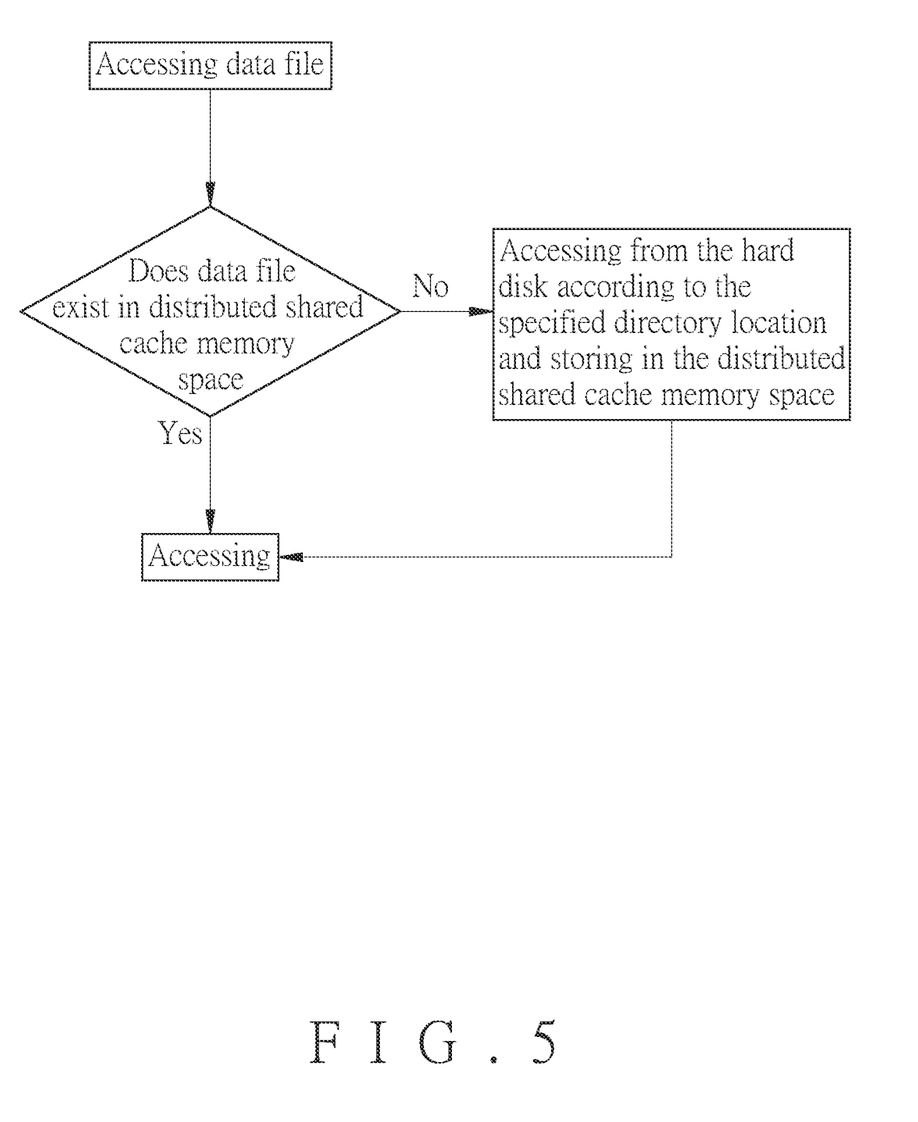
FIG. 5 is a flow chart of accessing a required data file when executing a distributed deep learning computing in accordance with an embodiment of the present disclosure.

The instruction of the GlusterFS is as follows:
gluster volume create vol_distributed transport tcp node1:/ramdisk node2:/ramdisk force
gluster volume start vol_distributed
apt-y install glusterfs-client
mount-t glusterfs node1:/vol_distributed/disfs With reference to FIGS. 3 to 5, in the distributed deep learning computing step, the cluster computer executes the distributed deep learning computing. Specifically, the computing node loverrides a related Dataset API required for the deep learning framework first, and the Dataset API includes a TensorFlow (tf.data) and a PyTorch (torch.utils.data), and a data file access rule is added to the distributed shared memory deployment and data file access management module, and the access rule adopts a remote direct memory access (RDMA) technology, such that each computing node 1 does not require a general network transmission for accessing a required data file, but the computing mode 1 can access the data file from the distributed shared memory cache space 2 directly. All computing nodes 1 continue their execution. When it is necessary to read the data file, if the data file exists in the distributed shared memory cache space 2, then the data file will be accessed directly, or else the data file will be obtained from the dataset 3 of the hard disk according to its original specified directory location and stored in the distributed shared memory cache space 2. For example, the data file is stored in the distributed shared memory cache space 2 before accessing the data file. Compared with the use of the traditional hard disk as caching (cache and buffer), the use of the distributed shared memory cache space 2 with such memory structure can greatly improve the access speed. Compared with the traditional cluster computing, this disclosure can store more and larger data files. Therefore, this disclosure can overcome the I/O performance bottleneck of repeatedly accessing a large number of small or super-large data files in deep learning computing and improve the deep learning computing performance.

In the step of releasing resources, the distributed shared memory cache space is released after the distributed deep learning computing ends. Specifically, after the distributed deep learning computing ends, all programs will call a destructor (Finalize function) and override the destructor, such that each computing node 1 unloads its distributed shared memory cache space 2, and all data files will disappear after the unload, such that the distributed shared memory cache space 2 of the computing node is released. In this way, the distributed shared memory cache space can dynamically form an On-Demand Global Cached Memory according to the requirements of a computing job, and the job is released immediately after its completion without occupying the system memory space permanently.

Figure 6:
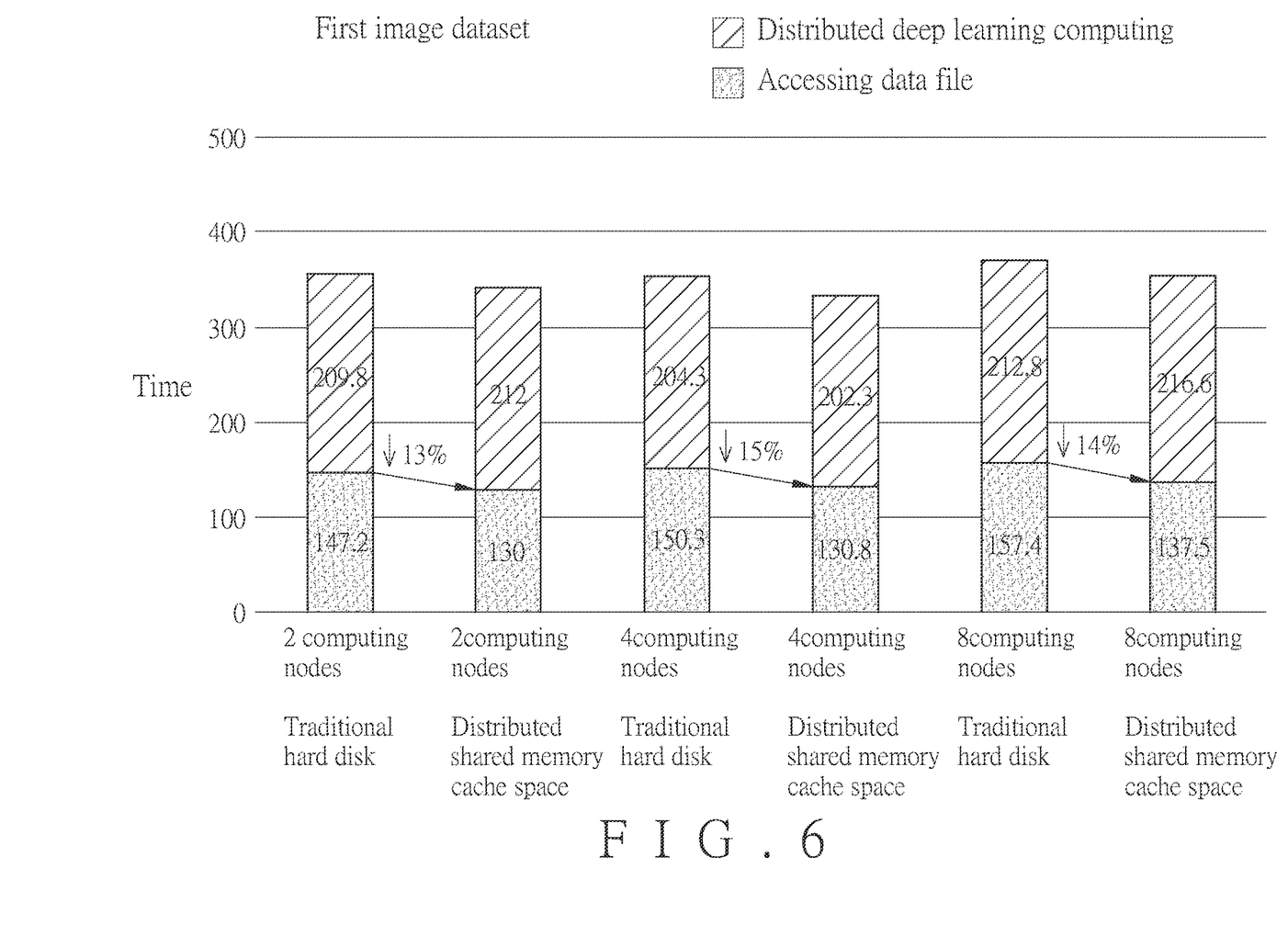
FIG. 6 shows a computing performance verification of the present disclosure, wherein multiple training datasets of a first image dataset are put into a distributed shared memory cache space of a computing node of an embodiment of the present disclosure and a traditional hard disk in a computing node respectively to observe the data file access time.

In the embodiment as shown in FIG. 6, the computing node 1 uses the virtual computing service provided by Taiwan Cloud Computing (TWCC) for computing and builds 8 virtual hosts, each including a 16 v-CPU, a 256 GB-memory, and a 100G-HDD hard disk. Training datasets of a first image dataset are placed in the distributed shared memory cache space 2 in the computing node 1 of an embodiment of the present disclosure and a hard disk in the computing node 1 for performing the verification of computing performance. FIG. 6 shows that the total computing time of the embodiment of the present disclosure decreases. Particularly, the time of accessing data files from the distributed shared memory cache space 2 is decreased by more than 13% when compared with the time of accessing data files from the traditional hard disk.

The on-demand shared data caching method applicable for distributed deep learning computing is executed by the computer program installed on the cluster computer, and the computer program can be stored in a computer readable medium.

While the invention has been described by means of specific embodiments, numerous modifications and variations could be made thereto by those skilled in the art without departing from the scope and spirit of the invention as set forth in the claims.

What is claimed is:

1. An on-demand shared data caching method applicable for distributed deep learning computing, comprising the steps of:

dynamically building a distributed shared memory cache space, in which a distributed shared memory deployment and data file access management module to a deep learning framework to share a part of memories of a plurality of computing nodes of a cluster computer and build a distributed shared memory cache space; and performing a distributed deep learning computing, in which the cluster computer executes a distributed deep learning computing, and the computing nodes override a Dataset API required by the deep learning framework, and a data file access rule of the distributed shared memory deployment and data file access management module is added, and all computing nodes continues their execution, and when it is necessary to read a data file, if the data file exists in the distributed shared memory cache space, then the data file will be accessed directly, or else the data file will be obtained from an original specified directory location and stored in the distributed shared memory cache space wherein a resource configuration step is executed before the step of dynamically building a distributed shared memory cache space, in which a job script is written and the quantity of the computing nodes, the quantity of CPUs/GPUs and the size of the distributed shared memory cache space required for running the program are set and sent to a queueing system for configuring resources, and the information of the configured resources is stored into an environment variable for executing the job script, and the environment variable comprises a computing nodes list ($PBS_NODEFILE), the size of a distributed shared memory cache space ($PBS_GLBMEM), and the queueing system starts executing the program set in the job script of each computing node according to the assigned list of the computing nodes.

2. The on-demand shared data caching method applicable for distributed deep learning computing according to claim 1, wherein the computing nodes list ($PBS_NODEFILE) and the size of the distributed shared memory cache space ($PBS_GLBMEM) in the environment variable are read to set and build the distributed shared memory cache space, and the built distributed shared memory cache space is mounted on a mount point:/disfs of each computing node.

3. The on-demand shared data caching method applicable for distributed deep learning computing according to claim 1, wherein when the step of dynamically building a distributed shared memory cache space is executed, an initial function will be called to perform an initialization, and the initial function is overridden to build the distributed shared memory cache space, and the distributed shared memory deployment and data file access management module uses a Gluster File System (GlusterFS) for execution to produce aRAM disk on the memory of each computing node, and then uses the GlusterFS to connect the RAM disk of each computing node in series to form the distributed shared memory cache space.

4. The on-demand shared data caching method applicable for distributed deep learning computing according to claim 3, wherein the memory is a temporary file system (tmpfs) in an Unix/Linux system.

5. The on-demand shared data caching method applicable for distributed deep learning computing according to claim 1, wherein the distributed shared memory deployment and data file access management module adopts a remote direct memory access (RDMA) technology.

6. The on-demand shared data caching method applicable for distributed deep learning computing according to claim 1, wherein the Dataset API required for the deep learning framework required comprises TensorFlow (tf.data), and PyTorch (torch.utils.data).

7. The on-demand shared data caching method applicable for distributed deep learning computing according to claim 1, wherein if the data file does not exist in the distributed shared memory cache space when reading the data file in the distributed deep learning computing step, then the data file will be stored into the distributed shared memory cache space first before it is accessed.

8. The on-demand shared data caching method applicable for distributed deep learning computing according to claim 1, further comprising a step of releasing resources, in which the distributed shared memory cache space is released after the distributed deep learning computing ends.

9. The on-demand shared data caching method applicable for distributed deep learning computing according to claim 8, wherein after the distributed deep learning computing ends, all programs will call a destructor (Finalize function) and override the destructor, such that each computing node unloads its distributed shared memory cache space, and all data files will disappear after the unload, such that the distributed shared memory cache space of the computing node is released.

* * * * *